United States Patent [19]
Ito et al.

[11] Patent Number: 5,292,471
[45] Date of Patent: Mar. 8, 1994

[54] PROCESS FOR FORMING A POLYESTER FILM

[75] Inventors: Tatsuya Ito, Gifu; Kenji Tsunashima, Kyoto; Hideyuki Yamauchi, Kusatsu; Seizo Aoki, Shiga; Hirokazu Kurome, Otsu, all of Japan

[73] Assignee: Toray Industries, Inc., Japan

[21] Appl. No.: 74,714

[22] Filed: Jun. 9, 1993

Related U.S. Application Data

[63] Continuation of Ser. No. 805,479, Dec. 11, 1991, abandoned.

[30] Foreign Application Priority Data

Dec. 13, 1990 [JP] Japan .................. 2-401878
Mar. 27, 1991 [JP] Japan .................. 3-63516

[51] Int. Cl.$^5$ .......... B29C 47/06; B32B 7/00; B32B 27/36
[52] U.S. Cl. .................. 264/171; 264/544; 264/320; 264/210.6; 428/480; 156/243; 156/244.19
[58] Field of Search .............. 264/171, 544, 210.1, 264/210.2, 210.6, 250, 319, 320; 425/133.5, 387.1, 388; 428/480; 156/242, 243, 244.11, 244.19

[56] References Cited

U.S. PATENT DOCUMENTS

| | | | |
|---|---|---|---|
| 3,197,538 | 7/1965 | Capron et al. | 264/235 |
| 3,547,891 | 12/1970 | Snead et al. | 264/210.1 |
| 3,577,510 | 5/1971 | Schmitz et al. | 264/544 |
| 3,871,947 | 3/1975 | Brekken | 264/171 |
| 3,975,485 | 8/1976 | Bollen et al. | 264/544 |
| 4,020,126 | 4/1977 | Gander et al. | 264/544 |
| 4,606,976 | 8/1986 | Hensel et al. | 264/171 |
| 4,765,999 | 8/1988 | Winter | 264/171 |

FOREIGN PATENT DOCUMENTS

| | | |
|---|---|---|
| 47-391 | 1/1972 | Japan . |
| 51-38335 | 3/1976 | Japan . |
| 62-19090 | 1/1987 | Japan . |

Primary Examiner—Jan H. Silbaugh
Assistant Examiner—Mathieu Vargot
Attorney, Agent, or Firm—Austin R. Miller

[57] ABSTRACT

A polyester film, which is substantially non-oriented and whose main component is polyethylene terephthalate, is formed into a shape for example, a package, at a condition causing no yield point. The formation ability of the polyester film for forming is improved, and a formed body having a good uniformity in thickness can be obtained. Further, the range of the temperature condition causing no yield point can be enlarged by laminating a PET-system polyester, which originally tends to cause a yield point by itself, onto a polyester having no yield point. In such a laminated polyester film, the slipping property and releasing property from a mold of the film can be improved by specifying the ranges of the degree of crystallinity of each layer, the adhesive force at a high temperature of the film and the surface roughness of the film, and the shape of a formed body can be improved.

14 Claims, 2 Drawing Sheets

PROCESS FOR FORMING A POLYESTER FILM

This application is a continuation of application Ser. No. 07/805,479, filed Dec. 11, 1991, now abandoned.

BACKGROUND OF THE INVENTION

1. Field of the Invention

The present invention relates to a process for forming a polyester film, and more particularly to a process for forming a polyester film which can obtain a formed body of the polyester film having good slipping property and uniformity in thickness with a good formation ability.

2. Description of the Prior Art

It has been proposed that polyester films can be used as packages by thermoforming them. For example, JP-A-SHO 47-391, JP-A-SHO 51-38335 and JP-A-SHO 62-19090 disclose the thermoforming of non-stretched films made from polyethylene terephthalate (PET), or copolymer or blended polymer of PET. Recently, non-stretched polyester films of PET-system have been in commerce as films called "A-PET" (amorphous PET).

In such proposed polyester films of PET-system for forming, however, in spite of expectance for substituting them for hard polyvinyl chloride sheets, their uses have not been developed so much. The reason is that formation ability thereof is not good and the formed bodies therefrom tend to have relatively great irregularities in thickness.

Moreover, since these polyester films for forming have poor slipping properties, scratches are liable to occur during handling. Further, since they have poor releasing properties from molds in thermoforming, the shapes of the formed bodies therefrom tend to be deformed, and scratches are liable to occur on the surfaces of the formed bodies. Furthermore, since their slipping properties are still poor even in the stage after forming, a decrease in quality occurs in a process after forming. Particularly, when the formed bodies are used as a package and a substance is automatically charged into the respective formed bodies, the formed bodies are stacked and set in a charging machine and they must be smoothly taken out from the machine one by one. When the conventional polyester films for forming are used for such a package and the formed bodies are employed in such a charging system, however, the formed bodies are sometimes caught on some part of the charging machine when they are taken out, and it causes a charging trouble.

SUMMARY OF THE INVENTION

An object of the present invention is to provide a process for forming a polyester film which can decrease the non-uniformity in thickness caused when the film is formed as a some shape, can improve the slipping properties in the stages of both the film and a formed body, and can improve the releasing property from a mold in thermoforming.

To accomplish this object and other objects, a process for forming a polyester film according to the present invention comprises the step of forming a polyester film, which is substantially non-oriented and whose main component is polyethylene terephthalate, at a condition causing no yield point.

If a film to be formed has a yield point, a thin portion of the film is stretched so as to be thinner and a thick portion thereof is difficult to stretch or is stretched so as to be relatively thick when the film is formed as a shape, for example, a package. Therefore, a package having a good uniformity in thickness cannot be obtained from such a film. In the process according to the present invention, however, since the polyester film, which is substantially non-oriented and whose main component is polyethylene terephthalate, is formed at a condition causing no yield point, the uniformity in thickness of a body formed from the film is fairly good.

The condition causing no yield point can be achieved mainly by the composition or lamination structure of the polyester film to be formed and the condition of temperature in the forming. Although the condition causing no yield point can be achieved by a polyester film having a composition prepared by blending a polyester polymer having no yield point and another polyester polymer, it is achieved preferably by a polyester film having a lamination structure of an A-layer formed from a polyester (A) having no yield point and a B-layer formed from a film whose main component is polyethylene terephthalate. Since this A-layer formed from a polyester (A) has a relatively high degree of crystallinity, the surface of the A-layer itself after forming is easily formed as a surface having a relatively large roughness suitable for slipping property. Alternatively, in a case where particles are contained in the A-layer, because the degree of crystallinity of the A-layer is high, protrusions on the surface of the A-layer suitable for slipping property can be easily formed by the particles. Therefore, such a polyester film can have a good slipping property when it is formed, and the body formed from the film also can have a good slipping property. Moreover, since the adhesive force of such a polyester film to a metal is relatively small because the degree of crystallinity of the A-layer is high, a good releasing property from a mold in thermoforming can be achieved.

BRIEF DESCRIPTION OF THE DRAWINGS

Some preferred exemplary embodiments of the invention will now be described with reference to the accompanying drawings which are given by way of example only, and thus are not intended to limit the present invention.

DETAILED DESCRIPTION OF THE PREFERRED EMBODIMENTS OF THE INVENTION

Figure 1:
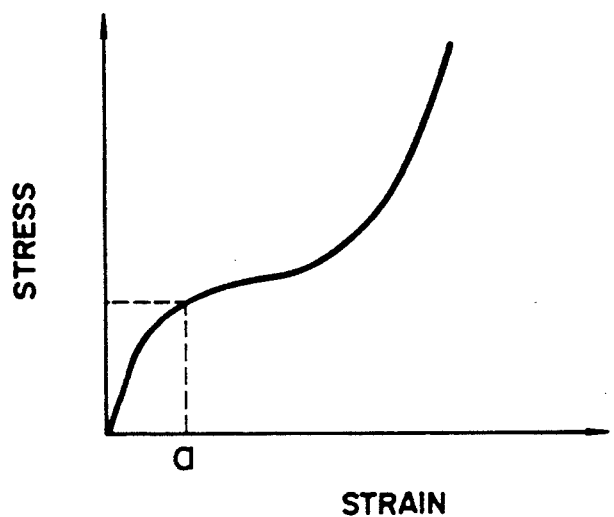
FIG. 1 is a graph showing an example of the relationship between the stretching stress and the strain of a film having no yield point.

Next, the present invention will be explained in more detail by embodiments and examples. However, the present invention is not restricted by the embodiments and examples.

In the present invention, a polyester film is formed in a some shape at a condition causing no yield point. Although this condition causing no yield point can be realized by making the polyester film to a film having a composition prepared by blending a polyester polymer originally having no yield point and another polyester polymer, preferably it is realized by using a polyester film having a lamination structure of an A-layer formed from a polyester (A) originally having no yield point and a B-layer formed from a film whose main component is polyethylene terephthalate. Namely, the polyester film having such a lamination structure is formed in a some shape, for example, a package, at a condition causing no yield point. The condition causing no yield point can be achieved mainly by controlling a forming temperature within the range as described later.

In the present invention, the melting point of polyester (A) is preferably not less than 180° C., and more preferably not less than 200° C. ΔTcg of the polyester (A), which is the difference between the cold crystallization temperature and the glass transition temperature of the polyester, is preferably not greater than 50° C., and more preferably not greater than 40° C. In a case where the melting point is lower than the above value or the ΔTcg is higher than the above value, the polyester film tends to melt-adhere to a mold in thermoforming, or the blocking propensity between the films increases. That the ΔTcg is low is advantageous for achieving a degree of crystallinity of the A-layer formed from a polyester (A) within the range defined by the present invention.

Polyester (A) is preferably, for example, polybutylene terephthalate, polybutylene naphthalate or a copolymerized polyester whose main component is polybutylene terephthalate or polybutylene naphthalate. The component to be copolymerized is, for example, ethylene glycol, neopentyl glycol, cyclohexanedimethanol, cyclohexanedicarboxylic acid, isophthalic acid or 2,6-naphthalenedicarboxylic acid. The amount of the copolymerization is preferably in the range of 1–45 mol %. Alternatively, as polyester (A), a polyester made by blending polybutylene terephthalate, polybutylene naphthalate or a copolymerized polyester whose main component is polybutylene terephthalate or polybutylene naphthalate and polycarbonate can be also used. Polycarbonate has a good compatibility with polybutylene terephthalate etc., and the crystallinity of polybutylene terephthalate etc. can be controlled by the blending. The amount of the blending of polycarbonate is preferably in the range of 1–45 wt %, more preferably in the range of 5–35 wt % relative to the entire polymer.

The glass transition temperature of a polyester, which forms a B-layer and whose main component is polyethylene terephthalate (hereinafter, also referred to as "PET"), is preferably not less than 60° C., and more preferably not less than 70° C. ΔTcg of the polyester is preferably not less than 60° C., and more preferably not less than 70° C. If the glass transition temperature is lower than the above value, the thermally dimensional stability of a body formed from the polyester film by thermoforming decreases and the formed body therefore tends to be deformed. If the ΔTcg of the polyester is lower than the above value, the formation ability of the polyester film decreases. This polyester is composed of a simple polyethylene terephthalate or a copolymerized polyester whose main component is polyethylene terephthalate. The component to be copolymerized is preferably, for example, 1,4-butanediol, neopentyl glycol, cyclohexanedimethanol, cyclohexanedicarboxylic acid, isophthalic acid or 2,6-naphthalenedicarboxylic acid. The amount of the copolymerization is preferably in the range of 1–45 mol %.

The inherent viscosity (IV) of polyester (A) is preferably in the range of 0.75–1.20, and the inherent viscosity (IV) of the polyester whose main component is PET is preferably in the range of 0.70–1.10. If either inherent viscosity of polyester (A) or inherent viscosity of the polyester whose main component is PET is lower than the above value, the change with the passage of time of the mechanical property of the film after producing a non-stretched film becomes large, particularly the elongation thereof greatly decreases. If the inherent viscosity is too high, the melt viscosity becomes too high. Therefore, it is difficult to produce a film, or even if it is possible to make a film, the formation stress of the film in thermoforming becomes too high. With respect to polyester (A), the elongation of the polyester (A) must be high because the layer of the polyester (A) in the film according to the present invention is thin, and therefore, preferably the inherent viscosity of the polyester (A) is relatively high.

In the polyester film for forming according to the present invention, the adhesive force between the surface of A-layer and a metal at a temperature of 100° C. is preferably not greater than 20 g, and more preferably not greater than 15 g. As aforementioned, one of the problems in the conventional PET-system films for forming is a poor releasing property from a mold in thermoforming. As the result of the investigation according to the present invention, it has been found that the above low adhesive force of the A-layer can increase the formation ability of the film to a some shape defined by a mold.

The degree of crystallinity of A-layer is preferably in the range of 5–20%, and more preferably in the range of 7–15%. In the present invention, inert particles can be added to the film in order to realize a good slipping property of the surface of a formed body by controlling the surface roughness of the A-layer of the film at a state of film within a desirable range. However, since a film for forming such as one according to the present invention is a non-stretched film, a good slipping property of the film cannot be obtained merely by adding particles to the film, because the added particles cannot form protrusions on the surface of the film effective to improve the slipping property of the film at the non-stretched state. After thermoforming, although a slightly good slipping property can be expected on the portions of the formed body which have been stretched in the forming process, remaining portions, which have not been stretched, cannot have a good slipping property, and the formed body still cannot have a good slipping property as a whole. In contrast, in the present invention, a sufficient slipping property can be obtained at both states of a film and a formed body by controlling the A-layer higher than the specified degree of crystallinity and adding the particles described later. On the contrary, if the degree of crystallinity of the A-layer is too high, the transparency of the film rapidly decreases and the film becomes hazy, as well as the formation stress in thermoforming elevates and the formation ability decreases, and particularly when vacuum forming system which can utilize only an ambient pressure is employed, a good formation ability cannot be obtained. That the degree of crystallinity of the A-layer is not less than 5%, by itself, is effective to improve the releasing ability from a high-temperature mold.

The degree of crystallinity of B-layer, which is composed of a polyester whose main component is polyethylene terephthalate, is preferably less than 5%, and more preferably less than 3%. If the crystallization of B-layer proceeds too much, the formation stress of the whole of the film increases and the formation ability of the film thereby decreases.

In the polyester film for forming according to the present invention, the mean surface roughness (Ra) of A-layer is preferably in the range of 0.005-0.1 μm, and more preferably in the range of 0.01-0.05 μm. When the mean surface roughness is not less than 0.005 μm, good slipping properties in the state of a film, during forming and in the state of a formed body can be obtained under the condition of the degree of crystallinity within the above-mentioned range. If the mean surface roughness is too great, the transparency of the film deteriorates.

In the present invention, preferably inert particles are added to A-layer, which composed of polyester (A), in order to facilitate the control of the surface roughness of the film. The mean particle diameter of the added inert particles is preferably in the range of 0.01-10 μm, and more preferably in the range of 0.1-5 μm. The amount of addition is preferably in the range of 0.01-0.5 wt %, and more preferably in the range of 0.05-0.3 wt %. If the mean particle diameter is too small, there is a fear that the particles cannot form sufficiently high protrusions on the surface of the film and a good slipping property cannot be expected. If the mean particle diameter is too large, the transparency of the film deteriorates, and this is therefore undesirable. The amount of addition of the particles is preferably in the above range from the same reasons. Where, the composition of the inert particles is, for example, an inorganic compound such as silicon oxide, aluminum oxide, zirconium oxide, calcium carbonate, magnesium carbonate or talc, or an non-meltable organic compound such as cross-linked polystyrene, cross-linked divinylbenzene, benzoguanamine or silicone. Particularly, colloidal silica, ground silica, cross-linked polystyrene and silicone are preferable from the viewpoint of maintaining the transparency of the film.

Although the total thickness of the polyester film for forming according to the present invention is about from 50 μm to 2 mm, the ratio in thickness between A-layer and B-layer (A:B) is preferably in the range of 1:200–1:4, and more preferably in the range of 1:100–1:5. This ratio in thickness should be decided depending upon the condition of use of the polyester film. For example, in a case of a process, wherein a package is quickly formed by plug assist, such as "PTP" (press through pack) for medicines, preferably the rate of A-layer in thickness is slightly raised in order to cover the poor stretching property of B-layer whose degree of crystallinity is relatively low. On the contrary, in a case of a process, wherein the forming speed is low and a film having a large forming stress is not suitable, such as a process wherein a relatively large blister package is formed by vacuum forming, the rate of A-layer in thickness is preferably reduced in order to prevent the forming stress of the A-layer from becoming too high. Particularly, in a polyester film having a thickness of not less than 300 μm, the thickness of the A-layer is preferably less than 50 μm, and more preferably less than 10 μm.

In the polyester film for forming according to the present invention or a formed body therefrom, a generally used additive, for example, antistatic agent, thermal stabilizer, oxidation inhibitor, crystalline nuclei agent, weather resistance agent, ultraviolet absorbent, pigment etc., may be added by the volume which does not substantially decrease the advantages according to the present invention. Further, a surface roughening processing such as embossing or sand mat processing, or a surface treatment such as corona treatment or plasma treatment may be conducted as needed.

The polyester film as described above is formed into some shape, for example, a package, at a condition causing no yield point in the present invention.

In the present invention, "forming" means that the polyester film is formed as a product having a required shape by heating and/or pressing the film. Typical forming processes are compression molding, vacuum forming, pressure forming, vacuum-pressure forming, and plug assist processes of these forming processes. However, the process for forming the polyester film is not particularly restricted in the present invention. With respect to the preheating of the film before forming, heating plate process or infrared heating process can be applied. In the preheating, however, heating for a too long period of time is not desirable, because the crystallization of A-layer proceeds too much and the film therefore becomes hazy.

Figure 2:
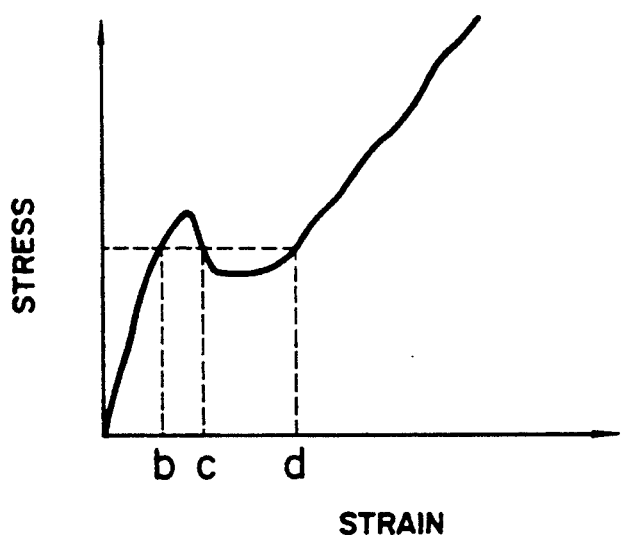
FIG. 2 is a graph showing an example of the relationship between the stretching stress and the strain of a film having a yield point.

In the present invention, "condition causing no yield point" means a condition of a state that, in a graph plotted with the data of stresses and strains generated when a substantially non-oriented film is stretched, the stresses correspond to the strains at one to one. FIG. 1 shows a typical pattern of a stretching stress having no yield point. In FIG. 1, one stretching stress corresponds to only one stretching strain "a". FIG. 2 shows a pattern of stretching in which a yield point is caused. In FIG. 2, a single stretching stress corresponds to three stretching strains "b", "c" and "d".

As a method effective to realize a condition causing no yield point in a polyester film for forming which uses a polyester having a yield point, there is the following method. The method comprises the step of laminating a polyester (A), which has no yield point and whose stretching stress is large, thinly onto a polyester which has a yield point and whose main component is polyethylene terephthalate. Typical polymers of this polyester (A) which has no yield point are polybutylene terephthalate, polybutylene naphthalate and copolymerized polymers thereof. The speeds of crystallization of these polymers are fast, and "ΔTcg"s of the polymers are not greater than 50° C. Of course, even in these polymers, there occurs a yield point in the area lower than a glass transition temperature "Tg" or when the polymers are stretched at an abnormally high temperature. In contrast, there is a polymer which has a yield point even if the stretching temperature is controlled at any temperature. Typical example of such a polymer is polyethylene terephthalate. In the present invention, the main component of B-layer is polyethylene terephthalate. The speed of crystallization of such a polymer is low, and ΔTcg of the polymer is not less than 60° C. In the present invention, an A-layer formed from a polyester (A) having no yield point is laminated onto a B-layer formed from a film whose main component is polyethylene terephthalate, and thereby a polyester film for forming, which does not cause a yield point when the film is formed under a particular condition, is produced.

From the viewpoint of realizing a condition causing no yield point and preventing the stretching stress from becoming too high, the thickness of A-layer is preferably not less than 1 μm and less than 50 μm, and more preferably not less than 3 μm and less than 10 μm. Further, the thickness of A-layer is preferably less than 15% of the total thickness of the polyester film to be formed, and more preferably less than 15% of the total thickness.

Figure 3:
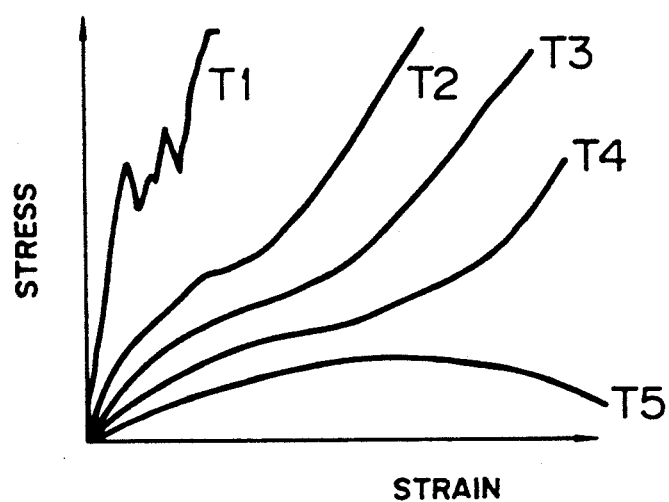
FIG. 3 is a graph showing an example of the variation of the stretching stress-strain curve of a film accompanying with the variation of temperature (T1-T5).

In the present invention, "range in temperature capable of realizing a state with no yield point" means, as shown in FIG. 3, a range in temperature "$\Delta T$" of from a temperature higher than a low temperature "T1" indicating a yield point to a temperature lower than a high temperature "T5" indicating a yield point again. Temperatures "T2", "T3" and "T4" indicating no yield point are in this range "$\Delta T$". This temperature range "$\Delta T$" is preferably not less than a range of 35° C., more preferably not less than a range of 40° C., and furthermore preferably not less than a range of 50° C., from the viewpoint of obtaining a uniform thickness of a formed body.

The stretching tension of A-layer is preferably in the range of from 5 times to 100 times of the stretching tension of B-layer, from the viewpoint of obtaining a uniform thickness of a formed body. This ratio between the stretching tensions is defined as a ratio between stretching tensions at a point of a stretching strain of 100% (stretching ratio: two times). In the determination of the ratio, a plurality of ratios are compared under a same condition in film thickness and in stretching condition.

In the present invention, the polyester film is formed under a condition of a temperature indicating no yield point within the above-mentioned range. Where, "temperature for forming" means a temperature which is actually applied to a film when the film is formed, and the temperature for forming is, for example, a preheating temperature in vacuum forming or a temperature for melting the paracrystal observed when the thermal property of a formed body is determined using a differential scanning calorimeter (DSC). Namely, when the polyester film is heated for forming, a paracrystal is generated having a melting point equal to the heating temperature. This paracrystal can be distinguished from an original crystal. When the thermal property of the formed body is determined in a similar manner after the formed body is molten again and thereafter rapidly cooled, the peak of the temperature for melting the paracrystal disappears. Here, there is a case where the temperature controlled in a practical forming machine does not meet with the temperature which is actually applied to a film. Particularly in an infrared heating, the determination of the temperature of a film is important, and the temperature can be determined by, for example, an infrared thermometer or a thermolabel.

The body formed by the process for forming a polyester film according to the present invention is suitable for a PTP package, a blister package, a tray, and other packages, containers and closures which have been made by thermoforming hard polyvinyl chloride sheets, and further for a carrier tape for electronic parts. However, the use for the formed body is not restricted by these materials.

Next, a process for producing the film according to the present invention will be explained. However, the process is not particularly restricted by the following one.

Polyester (A) and the polyester whose main component is PET are melt-extruded by separate extruders, and the extruded polymers are delivered from a feed block or a die having a composite manifold in a form of a film having a lamination structure of two kinds of polymers. The delivered film is cast and rapidly cooled at a temperature of not higher than the cold crystallization temperature of polyester (A), preferably not higher than the glass transition temperature thereof. The condition for this cooling is important to control the degree of crystallinity of each film layer of the cast film within the range defined by the present invention, and the cooling condition is appropriately set depending upon the used polyester resins. Where, it should be paid attention that the cooling condition includes not only the temperature for casting to cool the film but also various other conditions. Therefore, the cooling condition must be decided in consideration of other conditions such as those of the temperature of polymer extrusion, film thickness, the surface roughness of the casting drum and the rotational speed of the casting drum, and the condition of sheet contacting system such as electrostatic charge system or air knife system. The film according to the present invention is different from a film such as a biaxially oriented film whose final state can be controlled by the conditions of stretching and heat treatment after rapid cooling. For example, the surface roughness of the casting drum directly affects the coefficient of heat transfer between the film and the drum. When the surface is rough, a small amount of air intervenes between the film and the surface of the drum and the rate of heat transfer therebetween decreases. Thus, even if the temperature of the casting drum is in the same condition, the cooling rate of the film varies depending on the surface roughness of the drum. Also with respect to the condition of sheet contacting system, the cooling rate of the film varies. For example, the degree of the film contacting to the drum greatly varies depending upon whether an electrostatic charge system is employed or not, and thereby the cooling rate of the film greatly varies.

The cast film thus obtained is wound, and the polyester film for forming according to the present invention can be obtained. The degree of crystallinity of the polyester film may be controlled by, for example, bringing the film into contact with heated rollers. Moreover, various surface treatments or surface roughening treatments or processings may be conducted.

Next, methods for determining and estimating the characteristics in the present invention will be explained.

(1) Degree of Crystallinity

A section of the polyester film is made by cutting it in the thickness direction. The peak width at half height of the intensity of each layer in the film measured by laser Raman spectroscopic analysis is determined, and the degree of crystallinity is determined from the peak widths of the amorphous state and crystallized state of the polyester. The degree of crystallinity is also determined by a method wherein each layer in the film is cut out, the density of each layer is measured by a density gradient tube and the degree of crystallinity is determined from the densities of the amorphous state and crystallized state of the polyester.

(2) Melting Point (Tm), Glass Transition Temperature (Tg), Cold Crystallization Temperature (Tcc), $\Delta Tcg$ A differential scanning calorimeter (DSC-2 type; produced by Perkin Elmer corporation) is used for determination. A sample of 10 mg is placed at a melting state for five minutes in an atmosphere of nitrogen at a temperature of 280° C., and thereafter the sample is rapidly cooled in liquefied nitrogen. The sample obtained is heated at a speed of 10° C./min., the change of specific heat due to the transition to a glass state or a rubber state caused during the elevation of the temperature is determined, and the temperature causing this change is determined as the glass transition temperature (Tg). Further, the exothermic peak temperature accompanied with crystallization is determined as the cold crystallization temperature (Tcc), and the endothermic peak temperature due to melting of crystal is determined as the melting point (Tm). ΔTcg is the difference between the cold crystallization temperature and the glass transition temperature (Tcc-Tg).

(3) Inherent Viscosity (IV)

The inherent viscosity is determined at a temperature of 25° C. using o-chlorophenol as a solvent. The unit is dl/g.

(4) Mean Surface Roughness (Ra)

A stylus type surface roughness tester (Hommel tester T10) defined in DIN-4768 is used. The roughness (Ra) is determined as center line average height at a cut-off of 0.25 mm.

(5) Adhesive Force

An end portion of a film sample with a width of 10 mm and a length of 40 mm is bent at a position distanced by 5 mm from the terminal end to form the sample as a L-shape, and the portion of 10 mm×5 mm is stacked on an iron plate (surface roughness: 0. 2S) which is plated with chrome and heated to a predetermined temperature. After the sample is maintained in this state for twenty seconds, the sample is delaminated at an angle of 90 degrees from the plate at a speed of 30 mm/min., and the force at that time is determined by a strain gauge as the adhesive force. The unit thereof is "g".

(6) Formation Ability

The film is formed as a predetermined shape by using a forming machine (PTP forming machine; produced by CKD corporation). The preheating temperature of a hot plate heating system in the forming machine is defined as the temperature for forming the film. The formation ability is estimated by the following four ranks.

Rank "A": The film is uniformly formed without irregularity in thickness.
Rank "B": The film can be formed and a formed body can be in practice although there is an irregularity in thickness.
Rank "C": A body formed from the film has a large irregularity in thickness and it cannot be in practice.
Rank "D": The film cannot be formed because a blocking against a mold or a crack occurs.

The transparency of the formed body at a position of the pocket portion of the formed body is estimated by the following three ranks.

Rank "A": The transparency of the formed body is good.
Rank "B": Although the transparency of the formed body is not so good, the formed body can be used in practice.
Rank "C": The transparency of the formed body is very bad, and therefore the formed body cannot be used.

(7) Temperature for Melting Paracrystal

A freely selected portion, preferably a portion composed of only A-layer, is cut out from a formed body. The temperature for melting the paracrystal is observed when the sample of 10 mg is heated from room temperature at a speed of 10° C./min using a differential scanning calorimeter (DSC-2 type; produced by Perkin Elmer corporation). The temperature for melting the paracrystal is present as a peak temperature lower than the temperature for melting the crystal.

(8) Haze (A Value Converted to a Haze on 100 μm in Thickness)

The haze ($H_{100}$) is determined by the following equation, based on ASTM-D1003-61.

$$H_{100}(\%) = H \times 100/d$$

Where, "H" is an actual data of a haze (%), and "d" is the thickness of the film at a position where the haze is measured. An internal haze can be determined in a state wherein the film is dipped in a quartz cell containing tetralin.

(9) Stretching Tension

A film stretcher produced by T. M. Long corporation is used. The tensions of the film in the stretching direction and in the fixed direction (non-stretching direction) are determined by a transducer crip. With stretching conditions, stretching speed is 5000%/min., preheating time is 30 seconds, and the film is fixed in the transverse direction and stretched in the longitudinal direction. The thickness of the film is in the range of 200–250 μm.

EXAMPLES

Some preferred examples will be hereinafter explained together with some comparative examples. The resulted data of determination and estimation are shown in Tables 1 to 3.

EXAMPLE 1

Polybutylene terephthalate (PBT, ΔTcg=10° C., Tm=220° C., IV=0.94) was prepared as polyester (A), and polyethylene terephthalate copolymer copolymerized with 5 mol % 1,4-cyclohexanedimethanol as glycol component (P(E/C)T, ΔTcg=80° C., Tm=245° C., IV=0.80) was prepared as a polyester whose main component was polyethylene terephthalate (polyester (B)). Silicon oxide particles having a mean particle diameter of 0.2 μm were added to the polyester (A) by 0.3 wt %. These two kinds of polyesters were dried by vacuum drying to suppress the water content to a value of not greater than 50 ppm. The dried polyesters were melt-extruded separately by two extruders, the extruded polyesters were laminated in a feed block so that the layer of polyester (A) was positioned on each of the layer of polyester (B) (lamination structure: A/B/A) and the laminated polyesters were delivered out from a T-type die at a temperature of 275° C. in a form of a film. The film was cast onto a casting drum whose surface temperature was controlled at 40° C., the cast film was cooled thereon, and the cooled film was wound. Where, the surface roughness of the drum was 0.2S, the rotational speed of the drum was 10 m/min., an electrostatic charge system was employed to increase the cooling efficiency by bring the film into contact with the drum sufficiently. The total thickness of the film obtained was about 200 μm, and the thickness ratio in the lamination (A:B:A) was 8:185:8. The degree of crystallinity of the A-layer was 13%, and that of the B-layer was 2%. The inherent viscosity (IV) of the A-layer was 0.91, and that of the B-layer was 0.78. The pattern of the stretching tension (stress) of the film did not indicate a yield point similarly to a curve having no yield point shown in FIG. 3. The temperature range indicating no yield point in this film was broad and it was a range of 55° C. (80°–135° C.). The stretching tension of polyester (A) is eight times of that of polyester (B).

The formation ability of the film obtained was good under a condition within a broad range of forming temperatures. Moreover, the transparency of the film was good. Furthermore, a formed body was uniform in thickness, and the slipping property thereof was good.

EXAMPLE 2

The film was made in the same manner as that in Example 1 other than a condition that the content of the particles in the polyester (A) was 0.001 wt %. Although the pattern of the stretching tension of the film obtained was near that of Example 1, there was a case where the slipping property of the film was insufficient and the releasing property from a mold when it was formed was slightly poor. Further, there also was a case where the slipping property of the formed body was insufficient and it was difficult to smoothly take out the formed body from the group of stacked formed bodies one to one.

COMPARATIVE EXAMPLE 1

The film was made in the same manner as that in Example 1 other than a condition that the temperature of the casting drum was controlled at 10° C. The temperature range indicating no yield point of the film obtained almost could not be found, and even when the film could be formed, the irregularity in thickness was large. The releasing property from a mold of the film obtained was not good, and when the forming temperature is elevated, the forming was impossible.

EXAMPLE 3

The film was made in the same manner as that in Example 1 other than a condition that the temperature of the casting drum was controlled at 55° C. Although a body having a small irregularity in thickness could be formed from the film obtained, the stress of the film when it was formed was large, and the corners of the formed body could not be formed sharply. Although the slipping property of the film obtained and that of the formed body were both good, the transparencies thereof were slightly bad.

EXAMPLE 4

Polybutylene terephthalate (IV=1.4, Thyroid 150 was added by 0.075 wt % as an additive) was prepared as polyester (A), and polyester copolymer made by condensation polymerization with the mixture of ethylene glycol and cyclohexanedimethanol mixed by 50/50 mol % and 100 mol % terephthalic acid was prepared as a PET-system polyester (IV=1.0). The respective polymers were supplied to an extruder having a diameter of 90 mm and an extruder having a diameter of 250 mm. The polymers were laminated in a T-type to form a three layer lamination structure of A/B/A (thickness ratio: 5/90/5), and the laminated film was delivered out from the die. The delivered film was cast onto a sandblasted roll whose surface temperature was controlled at 40° C., and the cast film was cooled thereon. At the same time, the film was brought into contact with the surface of the roll by an air chamber method. The thickness of the film obtained was 200 μm, and the birefringence of the film was 0.001, namely, it was substantially non-oriented. The pattern of stretching of the film did not indicate a yield point similarly to a curve having no yield point shown in FIG. 3. The temperature range indicating no yield point in this film was broad and it was a range of 50° C. (80°–130° C.). The stretching stress of polyester (A) is ten times of that of the polyester whose main component is PET. The formation ability of the film obtained was good under a condition within a broad range of forming temperature.

EXAMPLE 5

The film was made in the same manner as that in Example 1 other than a condition that polyethylene terephthalate-isophthalate (PET/I, isophthalic acid component: 5 mol %, $\Delta Tcg=70°$ C.) was prepared as polyester (B). The formation ability of the film obtained was good under a condition within a broad range of forming temperatures. The transparency and slipping property of a formed body were both good, and the uniformity in thickness of the formed body was also good.

EXAMPLE 6

The film was made in the same manner as that in Example 1 other than conditions that polybutylene terephthalate-isophthalate (PBT/I, isophthalic acid component: 5 mol %, $\Delta Tcg=25°$ C.) was prepared as polyester (A) and that poly(ethylene-neopentyl)terephthalate (P(E/N)T, neopentyl glycol component: 5 mol %, $\mu Tcg=80°$ C.) was prepared as polyester (B). The formation ability of the film obtained was good under a condition within a broad range of forming temperature. The slipping property of a formed body was good, and the uniformity in thickness of the formed body was also good.

COMPARATIVE EXAMPLE 2

The film was made in the same manner as that in Example 3 other than a condition that polybutylene terephthalate-isophthalate (PBT/I, isophthalic acid component: 40 mol %, $\mu Tcg=40°$ C.) was prepared as polyester (A). The temperature range indicating no yield point of the film obtained almost could not be found, and even when the film could be formed, the irregularity in thickness was large. The releasing property from a mold of the film obtained was not good because the melting point of PBT/I used as polyester (A) was low (150° C.), and when the forming temperature is elevated, the forming was impossible.

COMPARATIVE EXAMPLE 3

The film was made as a single layer film of polyester (B) without laminating a layer of polyester (A). The film was made in a manner similar to that in Example 1, using a polyethylene terephthalate copolymer prepared by copolymerizing 5 mol % 1,4-cyclohexanedimethanol as the glycol component (P(E/C)T) as polyester (B) (silicon oxide particles were added by 0.3 wt %). The temperature range indicating no yield point of the film obtained almost could not be found, and even when the film could be formed, the irregularity in thickness was large. The releasing property from a mold of the film obtained was not good when the temperature for forming was elevated, and a sufficient forming could not be achieved.

EXAMPLE 7

The film was made in the same manner as that in Example 1 other than a condition that a polyester prepared by blending polybutylene terephthalate and polycarbonate at a weight ratio of 90:10 was used as polyester (A). The temperature range indicating no yield point in this film a range of 40° C. The stretching tension of polyester (A) was 6.5 times of the polyester whose main component was PET. The formation ability of the film obtained was good under a condition within a broad range of forming temperature, and the corners of a formed body could be formed sharp.

EXAMPLE 8

The film was made in the same manner as that in Example 1 other than a condition that a polyester prepared by blending polybutylene terephthalate and polycarbonate at a weight ratio of 70:30 was used as polyester (A). The temperature range indicating no yield point in this film a range of 35° C. The stretching tension of polyester (A) was 5.5 times of the polyester whose main component was PET. The formation ability of the film obtained was good under a condition within a broad range of forming temperature, and the transparency thereof was also excellent.

TABLE 1

| | Example 1 | Example 2 | Comp. Ex. 1 | Example 3 |
|---|---|---|---|---|
| Lamination Structure (μm) | | | | |
| First layer (A) | 8 | 8 | 8 | 8 |
| Second layer (B) | 185 | 185 | 185 | 185 |
| Third layer (A) | 8 | 8 | 8 | 8 |
| Degree of crystallinity (%) | | | | |
| First layer (A) | 13 | 13 | 4 | 22 |
| Second layer (B) | 3 | 2 | 2 | 6 |
| Third layer (A) | 13 | 15 | 4 | 24 |
| Surface Roughness (μm) | 0.021 | 0.008 | 0.009 | 0.027 |
| Adhesive force (g) | 9 | 9 | 22 | 6 |
| Haze (%) | 1.8 | 1.4 | 1.0 | 2.5 |
| Temperature range indicating no yield point (°C.) | 55 (80–135° C.) | 50 (80–130° C.) | — | 40 (100–140° C.) |
| Result of formation (formation ability/transparency) Forming temperature (Preheating temperature) | | | | |
| 85° C. | A/B | A/A | C/B | C/B |
| 100° C. | A/A | A/A | C/B | B/B |
| 115° C. | A/A | B/A | D/— | A/B |
| 130° C. | A/A | B/A | D/— | A/B |

TABLE 2

| | Example 4 | Example 5 | Example 6 | Comp. Ex. 2 | Comp. Ex. 3 |
|---|---|---|---|---|---|
| Lamination Structure (μm) | | | | | |
| First layer (A) | 10 | 8 | 8 | 8 | — |
| Second layer (B) | 180 | 185 | 185 | 185 | 200 |
| Third layer (A) | 10 | 8 | 8 | 8 | — |
| Degree of crystallinity (%) | | | | | |
| First layer (A) | 13 | 12 | 9 | 4 | — |
| Second layer (B) | 2 | 2 | 2 | 3 | 4 |
| Third layer (A) | 13 | 12 | 9 | 4 | — |
| Surface Roughness (μm) | 0.030 | 0.023 | 0.019 | 0.010 | 0.015 |
| Adhesive force (g) | 11 | 8 | 14 | 35 | 39 |
| Haze (%) | 1.5 | 1.6 | 1.7 | 1.5 | 1.6 |
| Temperature range indicating no yield point (°C.) | 50 (80–130° C.) | 45 (85–130° C.) | 40 (80–120° C.) | — | — |
| Result of formation (formation ability/transparency) Forming temperature (Preheating temperature) | | | | | |
| 85° C. | A/A | A/A | A/A | C/B | D/— |
| 100° C. | A/A | A/A | A/A | C/B | C/B |
| 115° C. | A/A | A/A | A/A | D/— | D/— |
| 130° C. | A/A | A/A | C/A | D/— | D/— |

TABLE 3

| | Example 7 | Example 8 |
|---|---|---|
| Lamination Structure (μm) | | |
| First layer (A) | 10 | 10 |
| Second layer (B) | 180 | 180 |
| Third layer (A) | 10 | 10 |
| Degree of crystallinity (%) | | |
| First layer (A) | 9 | 7 |
| Second layer (B) | 4 | 3 |
| Third layer (A) | 9 | 7 |
| Surface Roughness (μm) | 0.025 | 0.028 |
| Adhesive force (g) | 13 | 18 |
| Haze (%) | 1.8 | 1.7 |
| Temperature range indicating no yield point (°C.) | 40 (80–120° C.) | 35 (85–120° C.) |
| Result of formation (formation ability/transparency) Forming temperature (Preheating temperature) | | |
| 85° C. | A/B | A/A |
| 110° C. | A/A | A/A |
| 115° C. | A/A | A/A |
| 130° C. | C/A | C/A |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A process for forming a polyester film comprising the step of forming a laminated film, which is made by laminating a polyester A-layer having no yield point in a temperature range of a glass transition temperature thereof to 140° C. onto a substantially non-oriented polyester B-layer whose main component is polyethylene terephthalate, at a condition causing said laminated film to have no yield point at a temperature in the range of 80° C. to 140° C.

2. The process according to claim 1, wherein said polyester film is capable of possessing no yield point throughout a temperature range not less than a range of 35° C. within the range of a temperature of 80° C. to a temperature of 140° C.

3. The process according to claim 1, wherein the stretching tension of said A-layer is in the range of from 5 times to 100 times of the stretching tension of said B-layer.

4. The process according to claim 1, wherein the degree of crystallinity of said A-layer is in the range of 5–20%, and the degree of crystallinity of said B-layer is less than 5%.

5. The process according to claim 1, wherein the adhesive force between the surface of said A-layer and a metal at a temperature of 100° C. is not greater than 20 g.

6. The process according to claim 1, wherein the mean surface roughness (Ra) of said A-layer is in the range of 0.005–0.1 μm.

7. The process according to claim 1, wherein the thickness of said A-layer is not less than 1 μm and less than 50 μm.

8. The process according to claim 1, wherein the thickness of said A-layer is not less than 3 μm and less than 10 μm.

9. The process according to claim 1, wherein the thickness of said A-layer is less than 15% of the total thickness of said polyester film to be formed.

10. The process according to claim 1, wherein said A-layer contains inert particles.

11. The process according to claim 10, wherein the mean particle diameter of said inert particles is in the range of 0.01–10 μm.

12. The process according to claim 10, wherein said inert particles are inorganic particles selected from the group consisting of silicon oxide, aluminum oxide, zirconium oxide, calcium carbonate, magnesium carbonate and talc particles.

13. The process according to claim 10, wherein said inert particles are organic particles selected from the group consisting of cross-linked polystyrene, cross-linked divinylbenzene, benzoguanamine or silicone particles.

14. The process according to claim 1, wherein the ratio in thickness between said A-layer and said B-layer is in the range of 1:200–1:4.

* * * * *